May 20, 1958 R. G. KOLK 2,835,419
WATER CONTROL FOR TRANSPLANTER
Filed Sept. 29, 1954 3 Sheets-Sheet 1
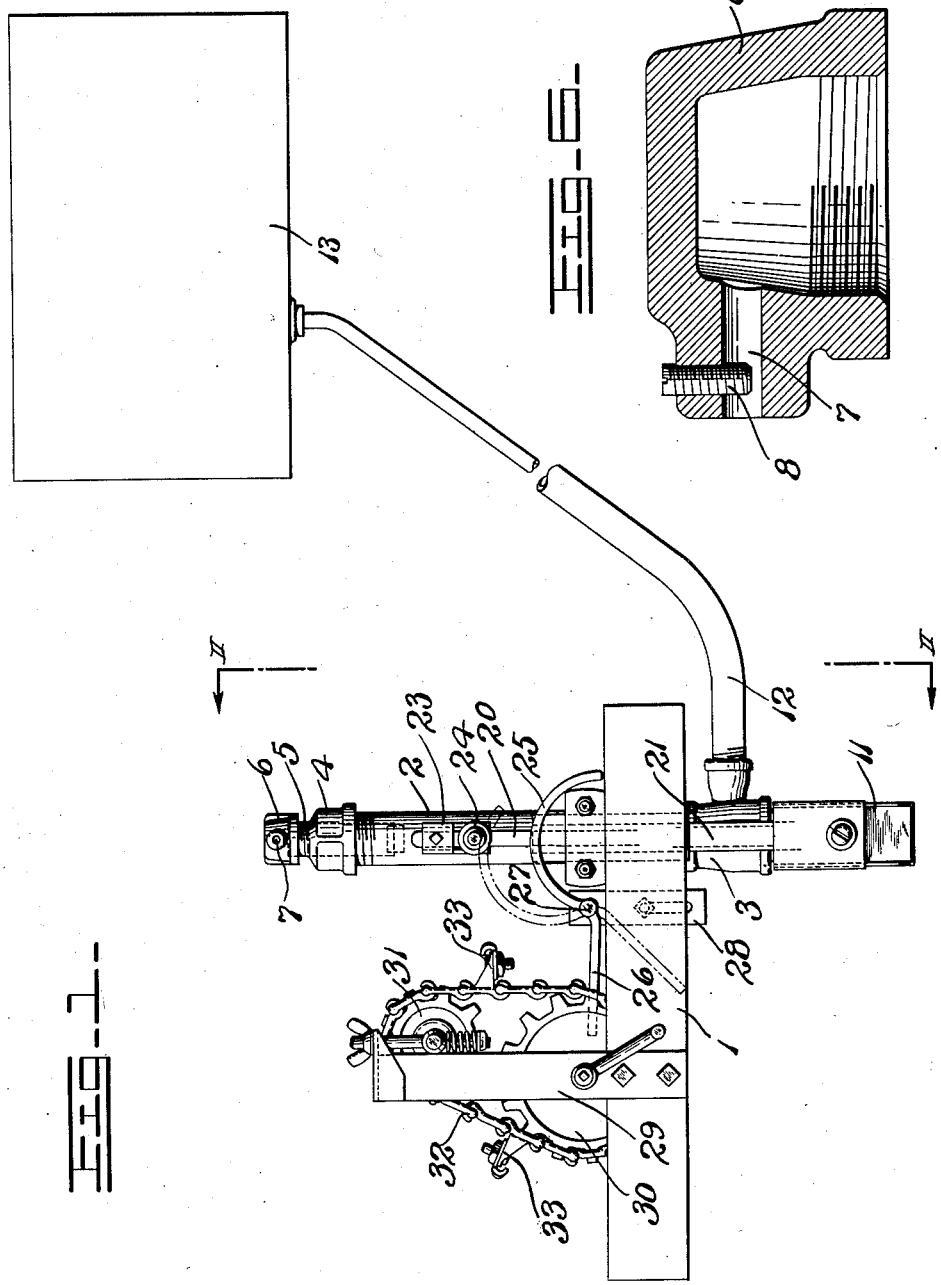
INVENTOR
Raymond G. Kolk
BY
Frank E. Liverance, Jr.
ATTORNEY

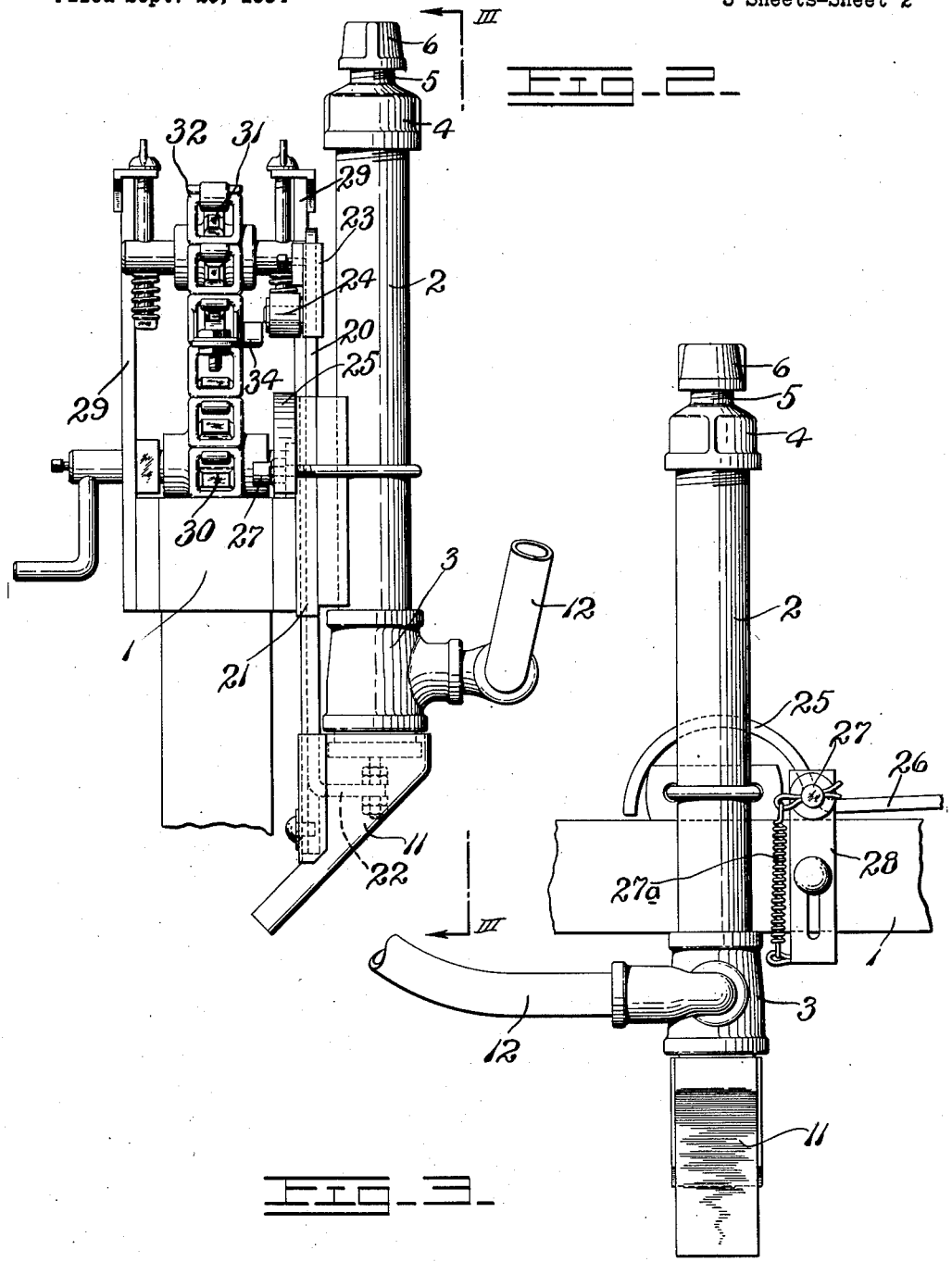

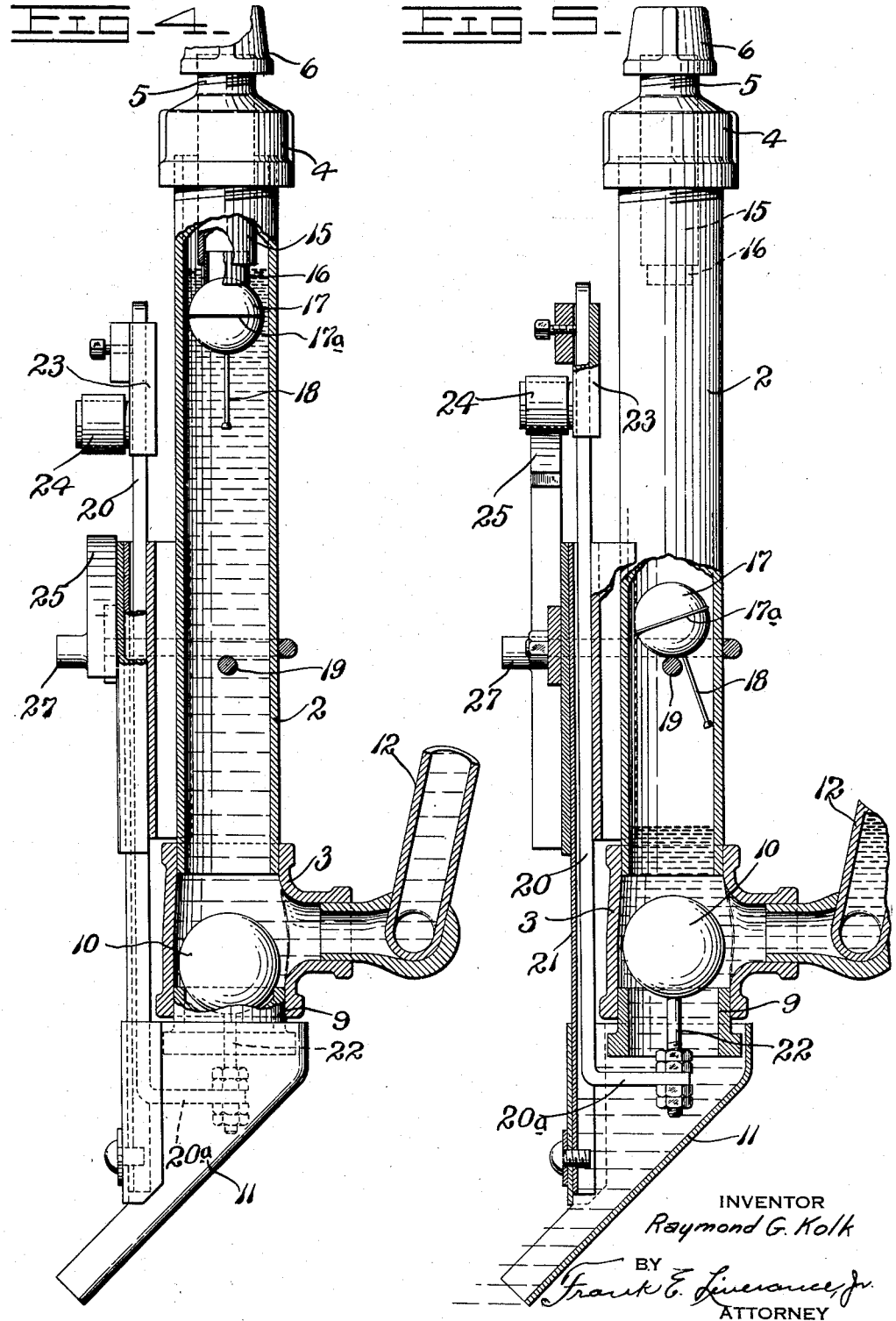

United States Patent Office 2,835,419
Patented May 20, 1958

2,835,419

WATER CONTROL FOR TRANSPLANTER

Raymond G. Kolk, Holland, Mich.

Application September 29, 1954, Serial No. 459,033

6 Claims. (Cl. 222—442)

This invention relates to a water depositing mechanism and control therefor adapted for use on transplanters.

Many small plants, after initial germination and growth to a desired size, are transplanted in rows at spaced apart intervals. Examples of such plants are celery and tobacco plants though there are many others in addition. In such transplanting, machines are used by means of which the plants are deposited, as the machine is drawn over the ground, in spaced intervals in a furrow therefor.

It is desirable that at each plant which is thus delivered and deposited a substantially predetermined quantity of water shall be delivered directly to and at the plant. Transplanting machines have heretofore had attached thereto water depositing mechanisms for the purpose stated but they are awkward, extend to too great a height and in those in which reduction in height has been attempted are prone to discharge water at the upper ends of the pipes so that those who by hand are placing the plants one after another in the continuous transplanting mechanism are frequently subjected to intermittent jets of water.

It is an object and purpose of the present invention to provide an especially efficient, practical, economically manufactured and sturdy and durable water delivery apparatus for transplanters, automatically operated as the planting takes place without leakage or projection of water streams or jets and with desired quantities of water deposited directly at the plants as they are transplanted, eliminating dribbling of water between the plants; and which structure is of relatively small size, is located below the water which is to be supplied to the plants and which, through its novel structure, attains the desired functions and attributes stated in an especially satisfactory manner.

An understanding of the invention and of a preferred structural embodiment thereof may be had from the following description, taken in connection with the accompanying drawings, in which, Fig. 1 is an elevation illustrating the transplanter environment of the invention and showing the water depositing and control apparatus associated therewith, together with an elevated tank from which water is taken.

Fig. 2 is an enlarged elevation of the structure shown in Fig. 1, viewing the same from the plane of line II—II of Fig. 1, looking in the direction indicated.

Fig. 3 is an elevation, viewing the apparatus of my invention from the plane of line III—III of Fig. 2 looking in the direction indicated.

Fig. 4 is a further enlarged partial elevation of the apparatus as in Fig. 2, the actual water control mechanism and the tubular housing therefor being partly in vertical section showing the position of the water control valves between the periodic deposits of the water.

Fig. 5 is an elevation like Fig. 4, partly in section showing the water control valves and the positions they occupy at the time of the water deposits, and Fig. 6 is an enlarged central vertical section through the upper vented cap of the structure.

Like reference characters refer to like parts in the different figures of the drawings.

As representing a part of the frame of the transplanter to which my invention is applied, a horizontal beam or bar 1 has permanently connected thereto at one side a vertical tube 2 which is an essential element of the structure of the water depositing mechanism. Such tube at its lower end has a T-union or coupling 3 permanently secured. Tube 2 at its upper end is exteriorly threaded and a cap 4 is screw connected thereto. The cap 4 has a centrally located upwardly extending exteriorly threaded nipple 5 to which a vent cap 6 is detachably screw connected. The cap 6 has a passage at 7 (Fig. 6) therethrough forming an air vent. As one means of adjusting the quantity of air which passes through such air vent 7, an adjusting screw 8 has a threaded connection with the cap and may be extended into or withdrawn from the vent passage 7 to greater or less degree, the air passing capacity being decreased when the screw 8 is threaded inwardly and increased when it is withdrawn. Such specific means described for adjusting the effective air passing area of the passage 7 is not in itself vital or essential to the invention as many different ways specifically of adjusting such air passing area are within the ability of those skilled in the art.

The T-coupling 3 at its lower end has a valve seat member 9 permanently secured. A ball valve 10 of a suitable material and which has a specific gravity preferably higher than that of water is within the coupling 3 so that normally when free to do so it closes the valve seat member 9 against water passage. When the ball valve 10 is lifted and water can pass downwardly it falls to the downwardly and inwardly inclined side of a chute or spout 11 which directs the water which passes the ball to the furrow in which plants are dropped.

A conduit 12 for carrying water into the coupling 3, which serves as a housing for the ball 10, is connected to such housing at one side and leads upwardly to a water supply tank 13. In the operation of the transplanter, such tank may be carried by the tractor which pulls the transplanter or may be supported in any other suitable way. It being at a height above the upper end of the tube 2, water passing down the conduit 12 into the valve housing 3 and thence upwardly into the tube 2 is under a head pressure in accordance with the elevation of the tank 13 and, if nothing was present to prevent it, would pass upwardly to the cap 4, thence into the cap 6 and out through the vent passage 7.

Integral with or permanently secured to the cap 4 so as to be in effect integral therewith is a sleeve 15, the axial opening therethrough being aligned with the opening through the nipple 5, sleeve 15 and nipple 5 providing a single sleeve structure. Such sleeve 15 depends downwardly a distance into the upper end portion of the water carrying tube 2. In its lower end a short sleeve 16 is permanently secured by brazing or other equivalent connection and provides a seat for a ball valve 17. Ball valve 17 in practice is made of sponge rubber and will float in water, being lifted by water coming into the tube 2 so that the upper surface of the ball 17 presses against the lower end of the valve seat member 16 and tightly closes against the passage of water upwardly through said member 16 and the tube 15. Because the floating ball valve 17 is usually manufactured in a divided mold it has a rib 17a around it which desirably should never come against the lower end of the seat 16. This is insured by attaching a weight which may conveniently be in the form of a small nail 18 at the lower pole of the ball 17 to maintain the rib 17a horizontal whenever the ball is lifted by water to come against the lower end of the valve seat member 16. A cross rod 19 extends from one side to the other of the water reservoir tube 2 which, if the water in the tube 2 should be lowered below such rod 19, provides a stop against the valve 17 and its weight 18 dropping low enough to interfere with the action of the lower ball valve 10.

A vertical rod or bar 20 is mounted in a suitable guide 21 alongside of and parallel to the length of the water reservoir tube 2. At its lower end portion it is bent laterally in an arm 20a which has permanent connection to a vertical rod 22 connected to the first ball valve 10 and extending downwardly therefrom. At the upper end portion of the bar 20 a roller carrying slide 23 is adjustably mounted which may be releasably fixed in any desired position by a set screw, on which is a laterally extending roller 24.

On the side of the transplanter frame represented by the bar 1 a valve actuating lever is mounted. Such lever includes one end portion 25, curved substantially in the arc of a half circle, and a second section 26 as a straight rod or bar. The lever is pivotally mounted between its ends at 27 and is shown as carried by a vertically adjustable supporting bar 28 mounted on the frame member 1.

It is evident that by depressing the end portion 26 of the lever the curved or cam portion 25 is lifted. Such part 25 being directly below the roller 24, upon its being lifted sufficiently to reach and engage the roller 24 further movement of the lever in the same direction or counter-clockwise will lift the roller, the bar 20 and ball valve 10 as in Fig. 5. The extent of the lift of the valve 10 depends upon how soon the cam portion 25 comes against the roller side 24. This can be changed by adjustment of the slide 23 upon the upper end portion of the bar 21.

In the transplanter mechanism are lower and upper sprocket chain wheels 30 and 31 mounted to rotate about horizontal axes carried by side bars 29 permanently secured to the transplanter frame. Wheel 30 is driven by the transplanter mechanism in a well known manner. An endless sprocket chain 32 is around said wheels. From such chain at spaced intervals projecting members 33 extend outwardly, each having a laterally offset portion at 34 which in the operation of the chain are carried successively downwardly to the part 26 of the ball valve operating lever, depressing such end 26 as shown in dotted lines in Fig. 1 and automatically lifting rod 20 and the lower ball valve 10. The projecting members 33 in the transplanter machine carry delivery or depositing cups or supports into each of which a plant to be dropped and planted is placed by an operator in attendance on the machine, the plant being deposited upon reaching a lower position. The adjustment of the bar 28 vertically governs the time when the lateral part 34 of each projecting member 33 comes to the end portion 26 of the lever which is to be depressed. With such adjustment an effective control of the time of lifting the ball 10 relative to the time of deposit of the plant is had.

With each elevation of the lower valve 10, such elevations occurring automatically and at intervals of time measured by the time that the plant carrying members 33 successively reach their delivery or depositing positions, water which fills the tube 2 to the extent as shown in Fig. 4 flows by gravity past the ball 10 and down the chute 11 being directed by such chute to the proper position with reference to the transplanted plant, together with additional water through tube 12. Such lift of the valve 10 is momentary, the valve quickly dropping back to closing position and the water which has been lowered in the water reservoir tube 2 is replaced by flow of water from the tank 13. A rapid lift of the upper ball valve 17 to closing position against its seat 16 takes place. The air vent passage at 7 will allow the inward passage of air when water is released from the tube and the outward passage of air when, after such release, it is again raised to the level like that shown in Fig. 4. The upper ball valve 17 of yielding resilient material forms a perfect seal against water passage upwardly through the sleeve 15, despite the relative rapidity with which such valve is successively lowered and raised. There is no escape of water under a head of pressure upwardly through the tube 15 and thence outwardly through the vent passage 7 in the upper cap 6. The adjustment of the cross sectional area of the passage 7 by means of the adjusting screw 8 is for controlling the quantity of air which can pass and therefore the rapidity with which the upper valve 17 raises and lowers.

The construction described attains the objects and purposes of the invention as first recited, in an exceptionally practical and effective manner.

The invention is defined in the appended claims and is to be considered comprehensive of all forms of structure coming within their scope.

I claim:

1. Structure comprising, a vertically mounted tubular water holder, a vertically movable normally closed closure valve at the lower end portion of said water holder, means for continuously supplying water at said valve to and through a side of said holder, a closure cap connected to the upper end of said water holder, a tubular sleeve connected to said cap extending downwardly therefrom a distance into the upper end portion of said water holder, said sleeve having communication with the air above said cap, and a valve freely movable in said tubular water holder and guided in its vertical movements by the sides thereof having an upper surface to sealingly press against the lower end of said sleeve, said valve floating in water and being elevated thereby to engage said sleeve.

2. In a water delivery apparatus having a vertical tubular water holder, a vertically movable closure valve at its lower end adapted to be periodically moved upwardly to water passing position and means to continuously supply water at said valve and at the lower end and through a side of said holder therefor under a head pressure above the upper end of said water holder at both the open and closed positions of said valve, the improvement comprising, a closure for the upper end of said water holder, a vertical sleeve through said closure, the lower end thereof extending a distance downward into the upper end portion of said water holder, and a freely floating valve in said tubular water holder guided by the vertical sides thereof having an upper surface pressed against the lower end of said sleeve on water lifting the valve thereto.

3. In a water delivery apparatus, a vertical tube, means for continuously supplying water at said valve to said tube adjacent its lower end from an elevation above the upper end of said tube, said tube having a vertically movable closure valve at its lower portion below the water entrance thereinto, means for supplying water to said tube at both open and closed positions of the closure, a closure cap at the upper end of said tube, a sleeve extending through said cap above it and downwardly into the upper portion of said tube, and a spherical floating resilient valve in said tube freely movable lengthwise thereof lifted by water to and guided by said tube into pressure engagement against the lower end of said sleeve when water lifted thereto.

4. Structure having the elements in combination defined in claim 3, a cap having an air vent opening secured to the upper end portion of said sleeve and manually operable means for adjustably controlling the air passing capacity of said vent in said cap.

5. In a controlled water delivery apparatus, having a vertical tube, a vertically movable closure valve at the lower end portion thereof adapted to be periodically lifted to open position, and means for continuously supplying the tube with water at both open and closed positions of said closure valve through a side of the holder at said valve and under a pressure head that normally would cause water to overflow the upper end of said tube, the improvement comprising a closure for the upper end of said tube, a sleeve centrally located in the upper end portion of said tube permanently connected with and depending from said closure, a freely floating valve in the tube below said sleeve having a spherical upper surface, and a depending weight connected with said floating valve for maintaining said valve when floating in water with said surface at the upper side of said valve to engage and press against the lower end of the sleeve when lifted thereto.

6. In structure as described, a vertical tube, a vertically movable valve closing the lower end thereof against water escape, and movable upwardly to allow such water escape, means for continuously supplying water under pressure to the tube at a side thereof, at said valve and at all positions of the valve, a cap closing the upper end of said tube, a centrally located vertical sleeve through said cap extending a distance into the upper end portion of said tube and having an upper end portion above said cap, a vent cap closing the upper end of said sleeve having an air vent passage, and a spherical resilient valve floatable in water within the tube guided by said tube to engage against the lower end of said sleeve when in uppermost position.

References Cited in the file of this patent

UNITED STATES PATENTS

| | | |
|---|---|---|
| 576,068 | O'Lally | Jan. 26, 1897 |
| 923,611 | Werd | June 1, 1909 |
| 1,795,503 | Prescott et al. | Mar. 10, 1931 |
| 2,333,310 | Greening | Nov. 2, 1943 |
| 2,565,045 | Ray | Aug. 21, 1951 |
| 2,601,834 | Carter | July 1, 1952 |